US008691156B2

(12) United States Patent
Choi et al.

(10) Patent No.: US 8,691,156 B2
(45) Date of Patent: Apr. 8, 2014

(54) PREFERENTIAL OXIDATION REACTOR AND FUEL CELL SYSTEM USING THE SAME

(75) Inventors: Jong-Rock Choi, Yongin-si (KR); In-Hyuk Son, Yongin-si (KR); Jin-Goo Ahn, Yongin-si (KR); Woo-Cheol Shin, Yongin-si (KR); In-Seob Song, Yongin-si (KR)

(73) Assignee: Samsung SDI Co., Ltd., Gyeonggi-do (KR)

( * ) Notice: Subject to any disclaimer, the term of this patent is extended or adjusted under 35 U.S.C. 154(b) by 315 days.

(21) Appl. No.: 12/957,922

(22) Filed: Dec. 1, 2010

(65) Prior Publication Data

US 2011/0281188 A1    Nov. 17, 2011

(30) Foreign Application Priority Data

May 17, 2010    (KR) ........................ 10-2010-0046002

(51) Int. Cl.
*B01D 50/00*    (2006.01)
*B01L 3/02*    (2006.01)
*B01J 10/00*    (2006.01)
*H01M 8/06*    (2006.01)

(52) U.S. Cl.
USPC ........... 422/177; 422/627; 422/638; 422/644; 422/648; 429/412

(58) Field of Classification Search
USPC ........... 422/177, 627, 638, 644, 648; 429/412
See application file for complete search history.

(56) References Cited

U.S. PATENT DOCUMENTS

| 8,182,750 B2 | 5/2012 | Han et al. |
| 2002/0150799 A1* | 10/2002 | Baumann et al. ............... 429/20 |
| 2005/0164066 A1 | 7/2005 | Lee et al. |
| 2006/0117660 A1 | 6/2006 | Woo et al. |

FOREIGN PATENT DOCUMENTS

| JP | 2003-012302 A | 1/2003 | |
| KR | 10-2004-0102501 | * 12/2004 | ............. H01M 8/06 |
| KR | 2005-0077846 A | 8/2005 | |
| KR | 2006-0063351 A | 6/2006 | |
| KR | 10-2007-0036454 | * 4/2007 | ............. H01M 8/04 |
| KR | 2007-0063581 A | 6/2007 | |
| KR | 10-0814887 B1 | 3/2008 | |
| WO | WO 2006/103998 A2 | 10/2006 | |

OTHER PUBLICATIONS

KIPO Office Action dated Oct. 24, 2012 for corresponding Korean priority application No. 10-2010-0046002.

* cited by examiner

*Primary Examiner* — Helen O Conley
(74) *Attorney, Agent, or Firm* — Knobbe, Martens, Olson & Bear LLP

(57) ABSTRACT

A preferential oxidation reactor for removing carbon monoxide in a hydrogen mixture gas is disclosed. The preferential oxidation reactor may include a housing having a catalytic layer provided therein, a mixture gas supply portion inserted into the interior of the housing and penetrating the catalytic layer, a condensate receiving portion contained within the housing and in fluid communication with a gas outlet port of the mixture gas supply portion and condensate control tubes arranged in the catalytic layer of the housing and in fluid communication with the condensate receiving portion. The condensate control tubes may have a capillary structure. A fuel cell system including the preferential oxidation reactor is also disclosed.

16 Claims, 6 Drawing Sheets

——→ moving passage of hydrogen mixed gas
------ exhausting passage of condensate water — moving passage of hydrogen mixed gas
---- exhausting passage of condensate water ------ exhausting passage of condensate water ▽ level

PREFERENTIAL OXIDATION REACTOR AND FUEL CELL SYSTEM USING THE SAME

CROSS-REFERENCE TO RELATED APPLICATIONS

This application claims priority to and the benefit of Korean Patent Application No. 10-2010-0046002, filed on May 17, 2010, in the Korean Intellectual Property Office, which is hereby incorporated by reference in its entirety.

BACKGROUND

1. Field of the Disclosure

The disclosed technology relates to a preferential oxidation reactor and a fuel cell system thereof, and more particularly, to a preferential oxidation reactor configured to prevent delay in a catalytic reaction due to the overflow of condensate or improve cooling efficiency of catalysts.

2. Description of the Related Art

As concern about the exhaustion of carbon energy and interest in environmental pollution have increased, studies have been conducted to develop nonpolluting electric energy. Particularly, studies have been conducted to develop a fuel cell capable of generating electric energy from abundant materials such as hydrogen and oxygen. Because of problems related to storage, hydrogen ($H_2$) fuel in fuel cells may be produced as a reformate obtained by reforming ethanol, methanol, liquefied petroleum gas (LPG), gasoline or the like. The reformate also includes carbon dioxide and carbon monoxide. Carbon monoxide in the reformate has a tendency to decrease electrode activation in the fuel cell. Thus, the amount of carbon monoxide should be decreased to about 10 ppm or less before the reformate may be used as a fuel in the fuel cell. A system or method for removing carbon monoxide in the reformate (hereinafter, referred to as a 'hydrogen mixture gas') may include use of a membrane of a palladium alloy, methanation, preferential oxidation, and the like. Systems for preferential oxidation use a preferential oxidation (Prox) reactor.

However, during the process of passing a hydrogen mixture gas through a catalytic layer, a heat exchange is performed between the hydrogen mixture gas and the catalytic layer and condensation of moisture in the hydrogen mixture gas occurs, which creates condensate water. Repetition of the process increases levels of the condensate water in a receiving portion. Condensate water should be removed from the receiving portion before increasing levels of condensate water contact the catalyst. If condensate water contacts the catalyst, oxidation reaction efficiency decreases.

SUMMARY OF CERTAIN INVENTIVE ASPECTS

In one aspect, a preferable oxidation reactor in which the collection amount of condensate water is maintained as a substantially constant level is provided. In some embodiments, the preferable oxidation reactor is configured to prevent catalysts from being wet by condensate water and thereby improve oxidation reaction efficiency.

In another aspect, a preferential oxidation reactor includes, for example, a housing having a catalytic layer provided therein, a mixture gas supply portion inserted into the interior of the housing and penetrating the catalytic layer, a condensate receiving portion contained within the housing and in fluid communication with a gas outlet port of the mixture gas supply portion and condensate control tubes arranged in the catalytic layer of the housing and in fluid communication with the condensate receiving portion.

In some embodiments, the condensate control tubes have a capillary structure. In some embodiments, the condensate control tubes are positioned upright from the condensate receiving portion such that lower portions of the condensate control tubes are within the condensate receiving portion. In some embodiments, upper portions of the condensate control tubes penetrate the top of the catalytic layer. In some embodiments, the preferential oxidation reactor further includes a partition plate between the catalytic layer and the condensate receiving portion. In some embodiments, the partition plate is positioned such that the mixture supply portion and the condensate control tubes penetrate the partition plate. In some embodiments, the partition plate has a porous structure. In some embodiments, the condensate control tubes are arranged along an inner circumferential surface of an inner wall of the housing. In some embodiments, the condensate control tubes are adhered to the inner wall of the housing.

In another aspect, a fuel cell system having a carbon monoxide reduction apparatus includes, for example, a fuel storage apparatus and a fuel reformer in fluid communication with the fuel storage apparatus.

In some embodiments, the fuel reformer includes a preferential oxidation reactor. In some embodiments, the fuel cell system further includes a steam reforming reactor. In some embodiments, the fuel cell system further includes a water gas shift reactor. In some embodiments, the water gas shift reactor is configured to reduce the content of carbon monoxide in a hydrogen mixture gas to between about 0.5 to about 1%. In some embodiments, the preferential oxidation reactor is positioned and configured to process the hydrogen mixture gas passing through the water gas shift reactor. In some embodiments, the condensate control tubes have a capillary structure. In some embodiments, the condensate control tubes are positioned upright from the condensate receiving portion such that lower portions of the condensate control tubes are within the condensate receiving portion. In some embodiments, upper portions of the condensate control tubes penetrate the top of the catalytic layer. In some embodiments, the fuel cell system further includes a partition plate between the catalytic layer and the condensate receiving portion, wherein the partition plate is positioned such that the mixture supply portion and the condensate control tubes penetrate the partition plate. In some embodiments, the partition plate has a porous structure. In some embodiments, the condensate control tubes are arranged along an inner circumferential surface of an inner wall of the housing. In some embodiments, the condensate control tubes are adhered to the inner wall of the housing.

BRIEF DESCRIPTION OF THE DRAWINGS

Features of the present disclosure will become more fully apparent from the following description and appended claims, taken in conjunction with the accompanying drawings. It will be understood these drawings depict only certain embodiments in accordance with the disclosure and, therefore, are not to be considered limiting of its scope; the disclosure will be described with additional specificity and detail through use of the accompanying drawings. An apparatus, system or method according to some of the described embodiments can have several aspects, no single one of which necessarily is solely responsible for the desirable attributes of the apparatus, system or method. After considering this discussion, and particularly after reading the section entitled "Detailed Description of Certain Inventive

DETAILED DESCRIPTION OF CERTAIN INVENTIVE EMBODIMENTS

Figure 1:
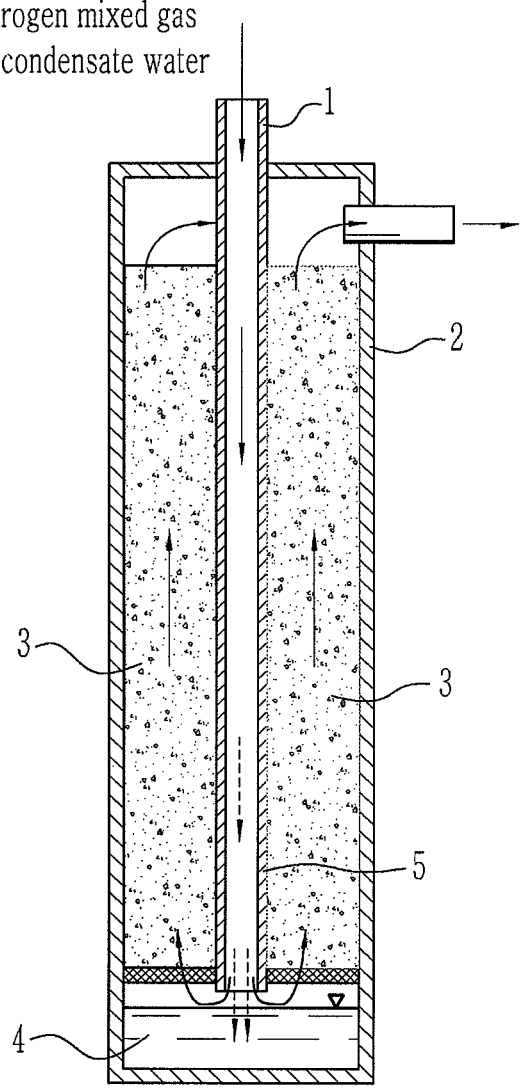
FIG. 1 is a schematic view showing the internal structure of a preferential oxidation reactor.

In the following detailed description, only certain exemplary embodiments of the present invention have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. Certain embodiments will be described in more detail with reference to the accompanying drawings, so that a person having ordinary skill in the art can readily make and use aspects of the present disclosure.

First, as depicted in FIG. 1, a preferential oxidation reactor may have a structure in which a supply tube 1 for hydrogen mixture gas is installed to penetrate a catalytic layer 3 in a housing 2. A condensate receiving portion 4 may be provided below the catalytic layer 3.

In operation, the preferential oxidation reactor may function to remove carbon monoxide. A high-temperature hydrogen mixture gas supplied to the interior of the housing 2 through the supply tube 1. The hydrogen mixture gas is oxidized by a direct contact with the catalytic layer 3 so that carbon monoxide may be removed from the hydrogen mixture gas and then exhausted to the exterior of the housing 2.

In this case, the hydrogen mixture gas may be initially supplied with a temperature of about 400° C. (about 200° C. when being supplied to the Prox). When the hydrogen mixture gas passes the catalytic layer 3 through the supply pipe 1, a heat exchange occurs with the catalytic layer 3 in a relatively low-temperature state, and moisture in the hydrogen mixture condenses in the supply tube 1. Condensate water is discharged from the supply tube 1 and collects in the condensate receiving portion 4.

As the aforementioned processes are repeated, the water level of the condensate water in the condensate receiving portion 4 increases. During operation of the oxidation reactor, the collected condensate water is swept away by the flow of the hydrogen mixture gas discharged through a discharge port 5 of the supply tube 1, so that the condensate water maintains a constant water level. However, if the rate of collection of condensate water is faster than a rate of discharging condensate water, the level of condensate water in the condensate receiving portion will increase until the condensate water contacts and wets the catalyst layer 3. When the catalyst layer 3 is wet by the condensate water, the temperature increase of the catalyst layer 3 is delayed in a re-operating process, and the oxidation reaction efficiency may decrease.

For reference, in the preferential oxidation reaction (Prox), a comparatively small amount of carbon monoxide CO may be contained in a large amount of hydrogen mixture gas, thereby removing the CO ($2CO+2O_2 <\rightarrow 2CO_2+O_2^-$). That is, if the water gas shift (WGS) is performed, the content of the CO is reduced by approximately 1%. Therefore, the preferential oxidation reaction is an exothermic reaction that generates a large amount of heat as a reaction in which the CO is burned with oxygen. Consequently, the preferential oxidation reaction may be performed at less than about 200° C. (for example, at about 100° C. or so). If moisture is condensed in a reactor, the activation of a catalytic layer is reduced. Therefore, in some embodiments of the present disclosure, the activation of the catalytic layer is enhanced by removing moisture. For example, moisture may be vaporized using a large amount of heat generated in the preferential oxidation reaction. The vaporized moisture may be exhausted through capillary tubes so as to maintain temperature within the reactor.

In some embodiments, the catalyst layer 3 is heated during the reaction process with the hydrogen mixture gas and cooled down by a cooling fan (not shown). When the temperature increase of the catalytic layer 3 is affected or delayed due to the condensate water, the cooling temperature may still be affected by the cooling fan. Nevertheless, the heating rate of the catalytic layer 3 may be irregular, which reduces oxidation reaction efficiency. Particularly, in this cooling method, as the outer wall of a housing is cooled down by a cooling fan, a catalytic layer in the housing is cooled down through thermal conduction. Since the cooling and heating efficiency of the catalytic layer may be easily changed depending on the operation of the cooling fan, the change in external temperature, or the like, the cooling efficiency is not constant. Further, the amount of power consumed by the cooling fan also affects the efficiency of the system.

Figure 2:
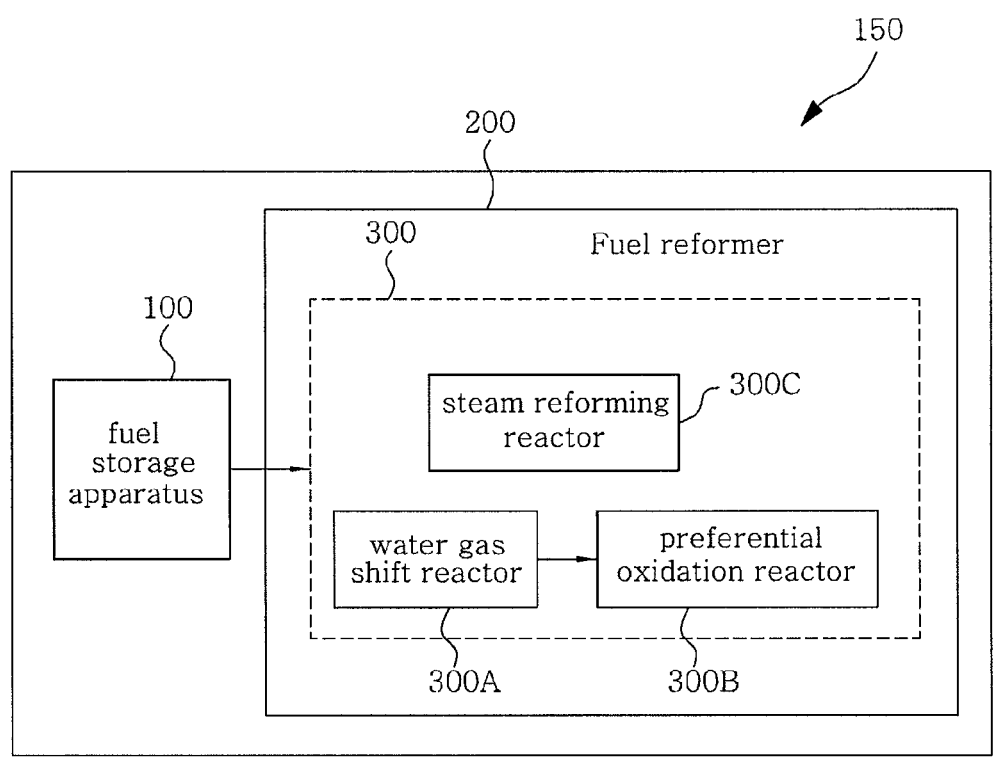
FIG. 2 is a schematic block diagram showing a structure of a fuel cell system.

FIG. 2 is a block diagram schematically showing a fuel cell system 50 including a preferential oxidation reactor according to an embodiment of the present disclosure. The fuel cell system 50 includes a fuel storage apparatus 100 and a fuel reformer 200. A carbon monoxide reduction apparatus 300 is installed in the fuel reformer 200. The carbon monoxide reduction apparatus 300 includes a water gas shift reactor 300A and a preferential oxidation reactor 300B. A steam reforming reaction may be performed through a steam reforming reactor 300C prior to a water gas shift reaction or preferential oxidation reaction. Although the carbon monoxide reduction apparatus 300, which will be described in further detail below, includes both the water gas shift reactor 300A and the preferential oxidation reactor 300B, it will be understood by one of ordinary skill in the art that in some embodiments the carbon monoxide reduction apparatus 300 does not include the steam reforming reactor 300C.

The configuration of the fuel cell system 50 will be further described for understanding of the present disclosure. First, the fuel storage apparatus 100 is a unit in which fuel for the fuel cell is stored before the fuel is reformed. The stored fuel may be methanol, liquefied natural gas (LNG), liquefied petroleum gas (LPG), gasoline, diesel or the like.

The fuel storage apparatus 100 is connected to the fuel reformer 200. The fuel reformer 200 is configured to produce a reformate (for example, hydrogen mixture gas) by reforming the fuel from the fuel storage apparatus 100. A steam reforming or partial oxidation method may be used as the fuel reforming method. The hydrogen mixture gas produced in the fuel reformer 200 generally contains between about 10% to about 13% carbon monoxide.

The carbon monoxide reduction apparatus 300 is configured to remove carbon monoxide contained in the hydrogen mixture gas regardless of whether the hydrogen mixture gas does or does not pass through the steam reforming reactor 300C. When the steam reforming reactor 300C is not present, the carbon monoxide reduction apparatus 300 is divided into a water gas shift reactor 300A and a preferential oxidation reactor 300B. The water gas shift reactor 300A functions to reduce the content of carbon monoxide in the hydrogen mixture gas to between about 0.5 and about 1%. The preferential oxidation reactor 300B is configured to remove carbon monoxide by re-processing the hydrogen mixture gas that passes through the water gas shift reactor 300A. In the preferential oxidation reactor 300B, an oxidation reaction is performed through a contact process with a separate catalyst.

As depicted in FIG. 3, the preferential oxidation reactor 300B includes a housing 310, a catalyst layer 330, a condensate receiving portion 340, a mixture gas supply portion 350 and a condensate control tubes 360. The housing 310 serves to enclose the preferential oxidation reactor 300B. The housing 310 includes an accommodating space formed in the interior of the housing 310, an exhaust port 312 formed at an upper portion of the housing 310, and an installation hole 314 formed at the center of the housing 310. Here, the exhaust port 312 is configured to exhaust the hydrogen mixture gas from the interior to the exterior of the housing 310. The installation hole 314 is also in fluid communication with the exterior of the housing 310.

A partition plate 320 with an external diameter identical to the inside diameter of the housing 310 is provided at an inner lower portion of the housing 310. The accommodating space formed in the interior of the housing 310 is partitioned into upper and lower spaces about the partition plate 320. The catalytic layer 330 is formed in the upper space and the condensate receiving portion 340 is formed in the lower space. In addition, the partition plate 320 serves as an entrance when the hydrogen mixture gas supplied into the housing 310 flows into the catalytic layer 330. The partition plate 320 also helps position the condensate control tubes 360, which will be described further below.

Figure 3A:
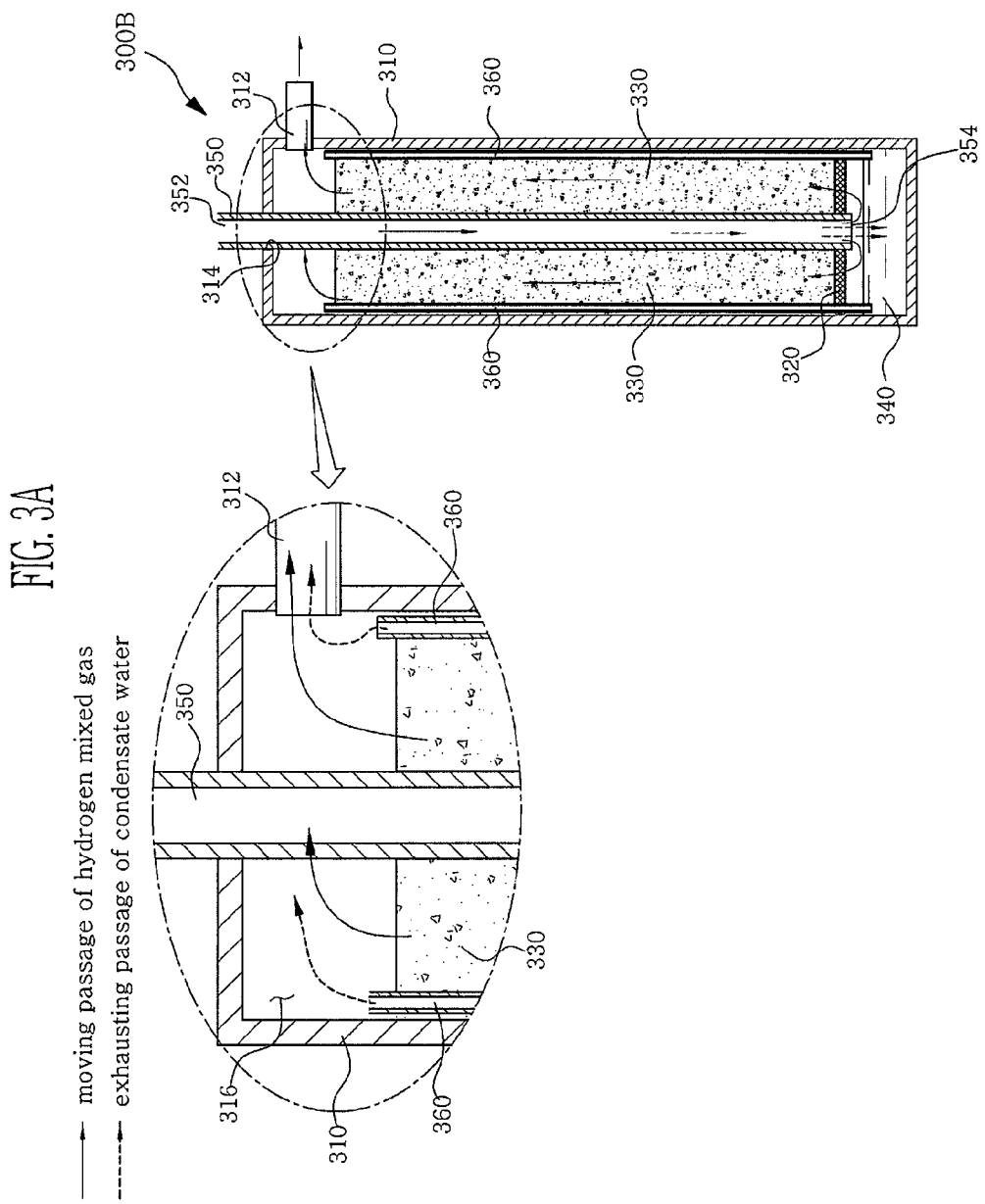
FIG. 3 is a schematic view showing an internal structure of a preferential oxidation reactor.
Figure 3B:
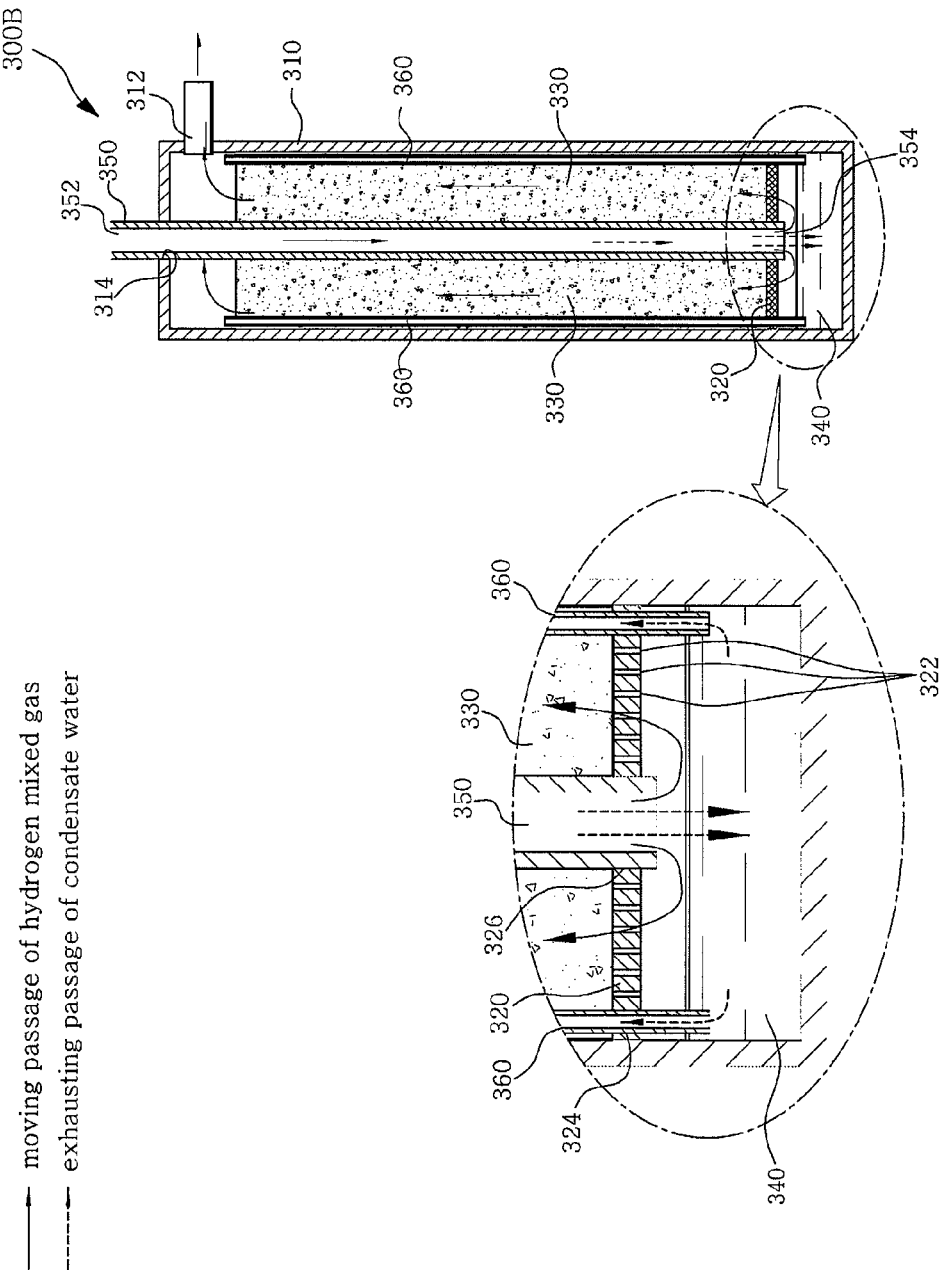

As depicted in FIG. 3B, an enlarged view of FIG. 3, the partition plate 320 has a porous structure in which micro-through-holes 322 having the hydrogen mixture gas passing therethrough are formed. In some embodiments, the micro-through-holes 322 are formed substantially throughout the partition plate 320. A plurality of first joint holes 324 are formed around an edge of the partition plate 320. The condensate control tubes 360 are joined with the partition plate 320 through the plurality of first joint holes 324. A second joint hole 326 is formed at the center of the partition plate 320. The mixture gas supply portion 360 is joined with the partition plate 320 through the second joint hole 326.

The condensate receiving portion 340 formed below the partition plate 320 may use a space portion naturally formed by the partition plate 320 as depicted in FIGS. 3 and 3A, or the condensate receiving portion 340 may be provided as a separate container installed below the partition plate 320.

As depicted in FIG. 3A, the mixture gas supply portion 350 is formed in the housing 310. The mixture gas supply portion 350 is configured to function as a supply path along which the hydrogen mixture gas exhausted from the water gas shift reactor 300A and supplied to the interior of the housing 310. The mixture gas supply portion 350 is formed in a pipe having a certain length. The mixture gas supply portion 350 penetrates the housing 310 through the installation hole 314.

As depicted in FIG. 3, an upper gas inlet port 352 is exposed to the exterior of the housing 310 so that the preferential oxidation reactor 300B may be connected to the water gas shift reactor 300A. A lower portion of the mixture gas supply portion 350 penetrates the second joint hole 326 of the partition plate 320 so that a lower gas outlet port 354 is exposed toward the condensate receiving unit 340.

As the mixture gas supply portion 350 is formed to longitudinally penetrate the interior of the housing 310, the joint body between the housing 310 and the mixture gas supply portion 350 may include a double-tube structure. Thus, the hydrogen mixture gas supplied through the mixture gas supply portion may be transferred through the housing in an independent path.

For example, the mixture gas supply portion 350 may be formed in a pipe shape and then may be inserted into the housing 310. Alternatively, the housing 310 and the mixture gas supply portion 350 may be simultaneously formed in a screen shape having the mixture gas supply portion 350 within the housing 310.

The catalytic layer 330 provided to the upper space above the partition plate 320 in the interior of the housing 310 is configured to perform the oxidation reaction of the hydrogen mixture gas supplied into the housing 310. The catalytic layer 330 may be formed by filling granular catalysts in the upper space portion above the partition plate 320. The catalyst used in the catalytic layer 330 may include platinum (Pt), palladium (Pd), rhenium (Re), rhodium (Rh), cerium (Ce), ruthenium (Ru), iridium (Ir) and the like. Such catalysts may be provided as single catalysts or two- or three-way catalysts. As illustrated in the embodiment of FIG. 3, the catalytic layer 330 does not filled in the entire of the upper space from the partition plate 320, but instead fills the upper space up to just beneath the exhaust port 312 of the housing 310. Thus, as illustrated in FIG. 3A, an exhaust space 316 is formed in the space above the catalytic layer 330, where the hydrogen mixture gas is subjected to oxidation. The exhaust space 316 serves to collect steam exhausted from condensate tubes 360 for water level control.

In some embodiments, the catalytic layer 330 is positioned within the interior of the housing 310 such that the catalytic layer 330 surrounds the entire of the outer circumferential surface of the mixture gas supply portion 350.

In addition to the configurations described above, the condensate control tubes 360 are installed in the housing 310. Here, the condensate control tubes 360 constitute a core structure. The condensate control tubes 360 are positioned and configured to maintain the water level in the condensate receiving unit 340 at a proper level by using capillary action as well as being positioned and configured to cool down the catalytic layer 330. The condensate control tubes 360 have a simple pipe structure. Lower portions of the condensate control tubes 360 penetrate the first joint holes 324 of the partition plate 320, respectively, so that the condensate control tubes 360 are erected in a direction substantially normal to the partition plate 320. As illustrated in FIG. 3A, upper portions of the condensate control tubes 360 are exposed into the exhaust space 316 of the housing 310 by penetrating the catalytic layer 330. As illustrated in FIG. 3B, lower portions of the condensate control tubes 360 are positioned in the condensate receiving portion 340 by penetrating the partition plate 320. Accordingly, the condensate control tubes 360 are positioned upright from and substantially normal to the surface of the liquid in the condensate receiving portion 340. Although the condensate control tubes 360 may be positioned substantially normal to the surface of the liquid in the condensate receiving portion 340 or substantially normal to the surface of the partition plate 320 (as depicted in FIG. 3A), other configurations of condensate control tubes may also be used. Such configurations include condensate control tubes 360, which are not substantially normal to the surface of either or both of the surface of the liquid in the condensate receiving portion 340 or the surface of the partition plate 320.

In operation of the preferential oxidation reactor 300B, condensate water gathered in the condensate control tubes 360 is vaporized through the heat exchange with the catalytic layer 330. Evaporation of the condensate water in the condensate control tubes 360 is increased as the amount of the condensate water positioned within the condensate control tubes 360 surrounded by the catalytic layer 330 is increased. Adjusting the inside diameter of the condensate control tubes 360 can adjust the amount of capillary action within the condensate control tubes 360.

Figure 4:
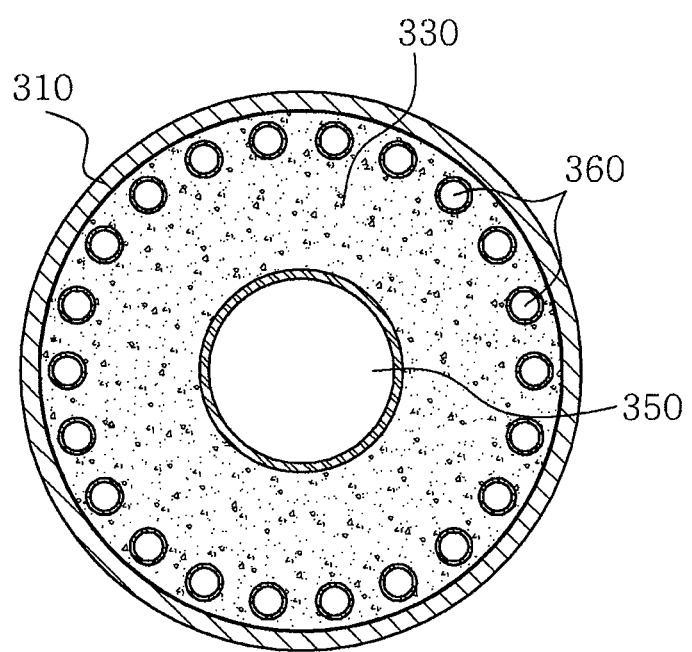
FIG. 4 is a cross-sectional view showing the arrangement structure of condensate control tubes.

As described above, since the plurality of first joint holes 324 through which the condensate control tubes 360 are joined with the partition plate 320 are formed around the edge of the partition plate 320, the condensate control tubes 360 are arranged around the inner wall of the housing 310 such that they are almost in contact with to the inner wall of the housing 310 as shown in FIG. 4.

An increased number of condensate control tubes 360 increases the heat exchange surface area between the condensate control tubes 360 and the catalytic layer 330. Accordingly, the evaporation amount of the condensate water and the cooling efficiency of the catalysts may also be increased.

In some embodiments, only a single condensate control tube is provided within a preferential oxidation reactor. In other embodiments a plurality of condensate control tubes are provided. The number of condensate control tubes provided within the preferential oxidation reactor will affect the evaporation amount of the condensate water, the necessary cooling rate of the catalysts, and the like. In some embodiments, a single condensate control tube may be formed in a spiral shape at the inner wall of the housing. Then, when no condensate water is filled in the condensate receiving portion, it is possible to prevent gas from being bypassed because the amount of the gas leaked through the one condensate control tube is relatively small.

Hereinafter, the operation of the embodiment illustrated in FIG. 3 will be described. First, the oxidation process of the hydrogen mixture gas supplied to the preferential oxidation reactor will be described. As depicted in FIG. 3, the hydrogen mixture gas exhausted from the water gas shift reactor passes through the catalytic layer 330 along the internal path of the mixture gas supply portion 350.

While the entering hydrogen mixture gas has a temperature of about 200° C., the catalytic layer 330 does not. Hence, the indirect heat exchange between the hydrogen mixture gas and the catalytic layer 330 is performed through the mixture gas supply portion 350. During this process, moisture contained in the hydrogen mixture gas is condensed on the inner wall of the mixture gas supply portion 350 due to the temperature difference between hydrogen mixture gas and the catalytic layer 330. The condensed water is discharged together with the hydrogen mixture gas through the gas outlet port 354. The condensed water is then collected in the condensate receiving portion 340.

The hydrogen mixture gas exhausted from the mixture gas supply unit 350 is supplied to the catalytic layer 330 by passing through the micro-through-holes 322 of the partition plate 320, and then passes through the catalytic layer 330. When the hydrogen mixture gas comes in contact with the catalytic layer 330, carbon monoxide is removed. Hydrogen gas passes through the catalytic layer 330 into the exhaust space 316 and then is exhausted to the exterior of the housing 310 through the exhaust port 312 of the housing 310. Then, the exhausted hydrogen gas may be supplied to a fuel cell. In this process, the catalytic layer 330 is heated by the reaction heat from the oxidation reaction between the hydrogen mixture gas and the catalytic layer 330.

Figure 5:
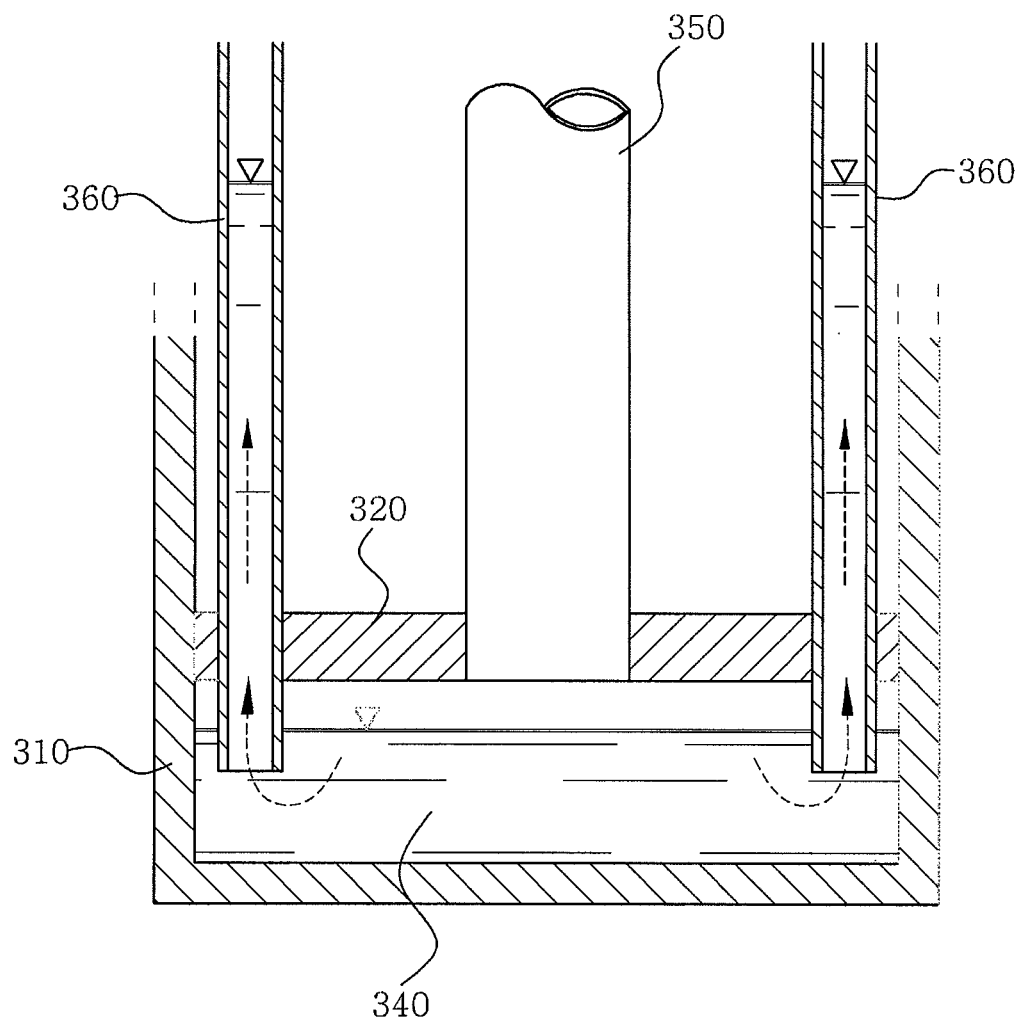
FIG. 5 is a schematic view showing how condensate water in a condensate receiving portion flows into the condensate control tubes by capillary action.

As the condensate water is continuously produced by repeating the process of processing the hydrogen mixture gas, the water level of the condensate water in the condensate receiving portion 340 is gradually raised. After the water level of the condensate water in the condensate receiving portion 340 is higher than the bottom of the condensate control tube 360 as depicted in FIG. 5, capillary action removes condensate water from the condensate receiving portion 340 into the condensate control tube 360 and the water level of the condensate water in the condensate receiving portion 340 may be maintained substantially constant. Thus, only the water level of the condensate water in the condensate control tube 360 is raised.

If the water level of the condensate water in the condensate control tube 360 is raised up to the section in which the catalytic layer 330 is positioned, the condensate water in the condensate control tube 360 is heated to a relatively high temperature and thus, the condensate water is vaporized by the heat exchange with the catalytic layer 330. The steam produced in this process is raised along the condensate control tube 360 and into the exhaust space 316 and then is exhausted together with the oxidized hydrogen mixture gas to the exterior of the housing 310 through the exhaust port 312.

While the operation of the preferential oxidation reactor is continued, the capillary action and the process of vaporizing condensate water due to the capillary action are repeatedly continued, so that the water level of the condensate water in the condensate receiving portion 340 may be maintained at a substantially constant level. Thus, it is possible to prevent the catalysts from being wet due to the overflow of the condensate water. Accordingly, the heating time of the catalysts is delayed in the oxidation reaction process, so that it is possible to prevent the oxidation reaction efficiency from decreasing.

While the heat exchange is performed between the condensate water in the condensate control tubes 360 and the catalytic layer 330, the cooling of the catalytic layer 330 is also performed together with the heating of the condensate water. Thus, the cooling efficiency can be improved as compared with the cooling methods using a cooling fan external to the housing 310. As the discharged condensate water is recycled as refrigerant, the consumption of cooling energy used in the cooling process may also be reduced.

Since the condensate control tubes 360 are arranged in the shape of surrounding the exterior of the catalytic layer 330 in the state that they may be almost adhered to the inner wall of the housing 310, and one layer of the condensate control tubes 360 may be formed between the catalytic layer 330 and the inner wall of the housing 310.

Unlike the structure depicted in FIG. 1, in which the catalytic layer comes in direct contact with the inner wall of the housing, (to be affected by changes in the environment external to the housing 2), the catalytic layer 330 illustrated in FIG. 3 is positioned such that it contacts the condensate control tubes 360 at a substantially constant temperature (the temperature of the condensate water in the condensate control tubes 360). Thus, the cooling efficiency of the catalytic layer 330 can be maintained substantially constant regardless of the operation of the external cooling fan, the external environment, and the like.

As described above, in some embodiments, the condensate control tubes are installed in the preferential oxidation reactor, such that it is possible to prevent the heating rate of the catalysts from being reduced due to the overflow of the condensate water. Further, the cooling rate of the catalysts can also be improved.

Various features of the present disclosure described above may be modified and combined by those skilled in the art. However, the modification and combination provide a separate condensate control means to the preferential oxidation reactor that constitutes a fuel cell system, so that it is possible to prevent the oxidation efficiency from being reduced due to wet catalysts caused by the overflow of condensate water. Also, the condensate control means can also function to cool down the catalysts in the process of processing the condensate water. Therefore, when the modification and combination are related to the configuration and object in which the cooling efficiency can be improved as compared with the related art, they may be included in the protection scope of the present invention.

While the present invention has been described in connection with certain exemplary embodiments, it will be appreciated by those skilled in the art that various modifications and changes may be made without departing from the scope of the present disclosure. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the disclosure is not limited to the disclosed embodiments, but, on the contrary, is intended to cover various modifications and equivalent arrangements included within the spirit and scope of the appended claims, and equivalents thereof.

What is claimed is:

1. A preferential oxidation reactor, comprising:
    a housing having a catalytic layer provided therein;
    a mixture gas supply portion inserted into the interior of the housing and penetrating the catalytic layer;
    a condensate receiving portion contained within the housing and in fluid communication with a gas outlet port of the mixture gas supply portion;
    a partition plate between the condensate receiving portion and the catalytic layer; and
    condensate control tubes arranged in the catalytic layer of the housing, the condensate control tubes penetrating the partition plate and in fluid communication with the condensate receiving portion, wherein the condensate control tubes have a capillary structure, and wherein the condensate control tubes are positioned upright from the condensate receiving portion such that lower portions of the condensate control tubes are within the condensate receiving portion.

2. The preferential oxidation reactor of claim 1, wherein upper portions of the condensate control tubes penetrate the top of the catalytic layer.

3. The preferential oxidation reactor of claim 1, wherein the partition plate is positioned such that the mixture supply portion penetrates the partition plate.

4. The preferential oxidation reactor of claim 3, wherein the partition plate comprises a porous structure.

5. The preferential oxidation reactor of claim 4, wherein the condensate control tubes are arranged along an inner circumferential surface of an inner wall of the housing.

6. The preferential oxidation reactor of claim 5, wherein the condensate control tubes are adhered to the inner wall of the housing.

7. A fuel cell system comprising a carbon monoxide reduction apparatus, comprising:
    a fuel storage apparatus; and
    a fuel reformer in fluid communication with the fuel storage apparatus, wherein the fuel reformer comprises the preferential oxidation reactor of claim 1.

8. The fuel cell system of claim 7, further comprising a steam reforming reactor.

9. The fuel cell system of claim 7, further comprising a water gas shift reactor.

10. The fuel cell system of claim 8, wherein the water gas shift reactor is configured to reduce the content of carbon monoxide in a hydrogen mixture gas to between about 0.5 to about 1%.

11. The fuel cell system of claim 10, wherein the preferential oxidation reactor is positioned and configured to process the hydrogen mixture gas passing through the water gas shift reactor.

12. The fuel cell system of claim 7, wherein upper portions of the condensate control tubes penetrate the top of the catalytic layer.

13. The fuel cell system of claim 12, wherein the partition plate is positioned such that the mixture supply portion penetrates the partition plate.

14. The fuel cell system of claim 13, wherein the partition plate comprises a porous structure.

15. The fuel cell system of claim 11, wherein the condensate control tubes are arranged along an inner circumferential surface of an inner wall of the housing.

16. The fuel cell system of claim 15, wherein the condensate control tubes are adhered to the inner wall of the housing.

* * * * *